(12) United States Patent
Kuwabara

(10) Patent No.: US 9,725,119 B2
(45) Date of Patent: Aug. 8, 2017

(54) CABIN FRONT PART SUPPORTING BODY

(71) Applicant: FUJI JUKOGYO KABUSHIKI KAISHA, Tokyo (JP)

(72) Inventor: Mitsumasa Kuwabara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/050,881

(22) Filed: Feb. 23, 2016

(65) Prior Publication Data

US 2016/0264180 A1 Sep. 15, 2016

(30) Foreign Application Priority Data

Mar. 10, 2015 (JP) .................... 2015-046907

(51) Int. Cl.
| | |
|---|---|
| B62D 25/00 | (2006.01) |
| B62D 25/04 | (2006.01) |
| B60S 1/04 | (2006.01) |
| B62D 25/14 | (2006.01) |
| B62D 25/08 | (2006.01) |

(52) U.S. Cl.
CPC ............ *B62D 25/04* (2013.01); *B60S 1/0488* (2013.01); *B62D 25/14* (2013.01); *B62D 25/082* (2013.01)

(58) Field of Classification Search
CPC ........ B62D 25/04; B62D 25/14; B60S 1/0488
USPC .................................................... 296/193.02
See application file for complete search history.

(56) References Cited

U.S. PATENT DOCUMENTS

| | | | | |
|---|---|---|---|---|
| 6,695,374 | B1* | 2/2004 | Gebreselassie | ....... B60R 13/083 180/90 |
| 8,317,256 | B2* | 11/2012 | Da Costa Pito | ..... B62D 25/145 296/193.02 |
| 2012/0049574 | A1* | 3/2012 | Atsumi | ................ B62D 25/145 296/193.02 |

FOREIGN PATENT DOCUMENTS

| | | |
|---|---|---|
| JP | 2010-143395 | 7/2010 |
| JP | 2012-166741 | 9/2012 |

OTHER PUBLICATIONS

Japanese Office Action issued Aug. 30, 2016 in Japanese Patent Application No. 2015-46907 (5 pages including machine translation).

* cited by examiner

*Primary Examiner* — Joseph D Pape
(74) *Attorney, Agent, or Firm* — Smith, Gambrell & Russell, LLP

(57) ABSTRACT

A cabin front part supporting body includes a front frame that contacts a thickened part of a cabin front wall part disposed to cover a front side of an instrument panel and extends in vehicle width directions of an automobile, a rear frame that is disposed inside the instrument panel and rearward of the front frame and extends in the vehicle width directions, and side frames in a pair annularly coupling both end parts of the front frame to both end parts of the rear frame, respectively.

17 Claims, 3 Drawing Sheets

CABIN FRONT PART SUPPORTING BODY

CROSS-REFERENCE TO RELATED APPLICATION

The present application claims priority from Japanese Patent Application No. 2015-046907 filed on Mar. 10, 2015, the entire contents of which are hereby incorporated by reference.

BACKGROUND

1. Technical Field

The present disclosure relates to a cabin front part supporting body, and particularly to the cabin front part supporting body provided in an instrument panel.

2. Related Art

Conventionally, various kinds of supporting bodies have been utilized to reduce a deformation of a cabin of an automobile when the automobile collides with an object. For example, in a case of a front collision, front side frames extending forward of the cabin, etc. can absorb the impact to reduce the cabin deformation. However, when the object collides with a side part of the automobile, the cabin deformation may be caused since the impact is inputted from outside of the supporting body in a width direction of the automobile and reaches the cabin without the strength of the impact being reduced so much.

Thus, as an art for reducing the cabin deformation against the impact on the side part of the automobile, Japanese Unexamined Patent Application Publication (JP-A) No. 2012-166741 proposes a reinforcing structure of a hinge pillar either on left or right side of an automobile, which is provided with bolts for coupling an instrument panel bracket, an inner hinge pillar part and an outer hinge pillar part in a width direction of the automobile, for example. In this hinge pillar reinforcing structure, since the instrument panel bracket is coupled with the hinge pillar so as to reinforce the hinge pillar, the hinge pillar (comprised of the inner and outer hinge pillar parts) is hardly separated even when a large collision load is applied to the hinge pillar, thereby reducing the cabin deformation.

However, since only the single instrument panel bracket (steering support beam) extending in the width directions supports the hinge pillars (front pillars) in the hinge pillar reinforcing structure disclosed in JP-A No. 2012-166741, it is hard to fully absorb the collision impact. Especially, in a case where an object K collides with a side part of an automobile M and an impact T is then obliquely inputted to the side part as illustrated in FIG. 5, the impact T is directly applied to the single steering support beam since not enough number of frames which are to absorb the impact T are provided between a cabin C and the side part of the automobile M. Therefore, a deformation of the cabin C may be larger.

SUMMARY OF THE INVENTION

It is desirable to provide a cabin front part supporting body which certainly reduces a deformation of a cabin of an automobile.

An aspect of the present disclosure provides a cabin front part supporting body includes a front frame contacting a thickened part of a cabin front wall part and extending in vehicle width directions of an automobile, the cabin front wall part being disposed to cover a front side of an instrument panel, a rear frame disposed inside the instrument panel and rearward of the front frame, and extending in the vehicle width directions, and a pair of side frames annularly coupling both end parts of the front frame to both end parts of the rear frame, respectively.

The cabin front wall part may be comprised of a bulkhead, and a toe board disposed below the bulkhead, and the thickened part may be formed by joining the bulkhead to the toe board.

The front frame may be disposed to cover the thickened part comprised of the joined part of the bulkhead and the toe board.

The thickened part may be formed in the cabin front wall part so as to continuously extend in the vehicle width directions, and the front frame may extend along the thickened part.

The both end parts of rear frame may be respectively coupled to front pillars in a pair, the front pillars being disposed so as to interpose the instrument panel between the front pillars.

The rear frame is a steering support beam that supports a steering column inside the instrument panel.

BRIEF DESCRIPTION OF THE DRAWINGS

The present disclosure is illustrated by way of example and not by way of limitation in the figures of the accompanying drawings, in which like reference numerals indicate like elements and in which.

DETAILED DESCRIPTION

Figure 1A:
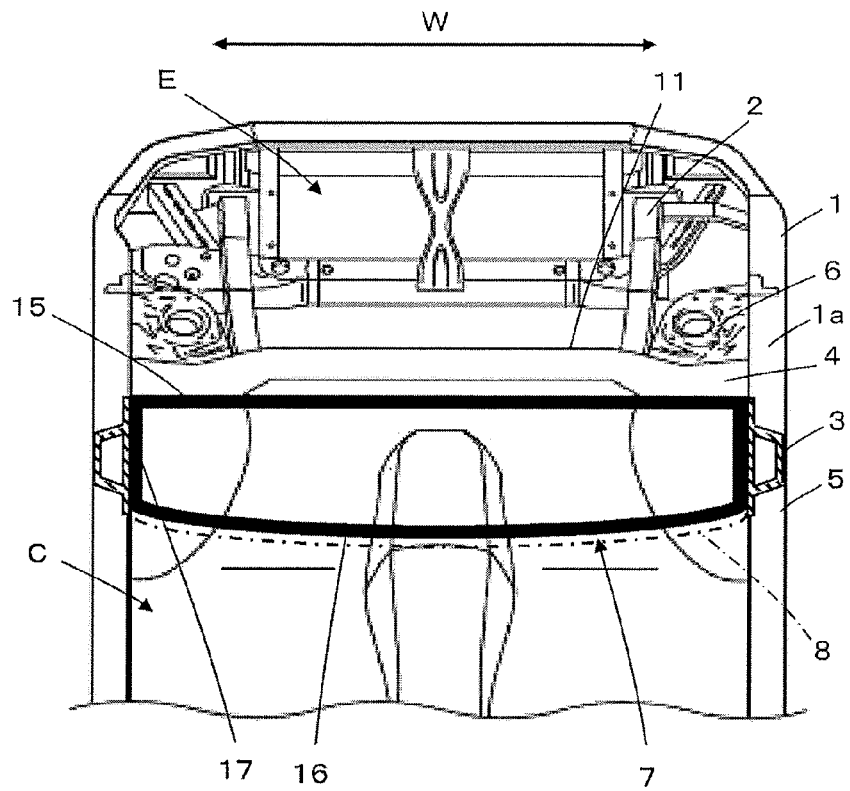
FIGS. 1A and 1B are views illustrating a configuration of an automobile provided with a cabin front part supporting body according to one implementation of this disclosure.
Figure 1B:
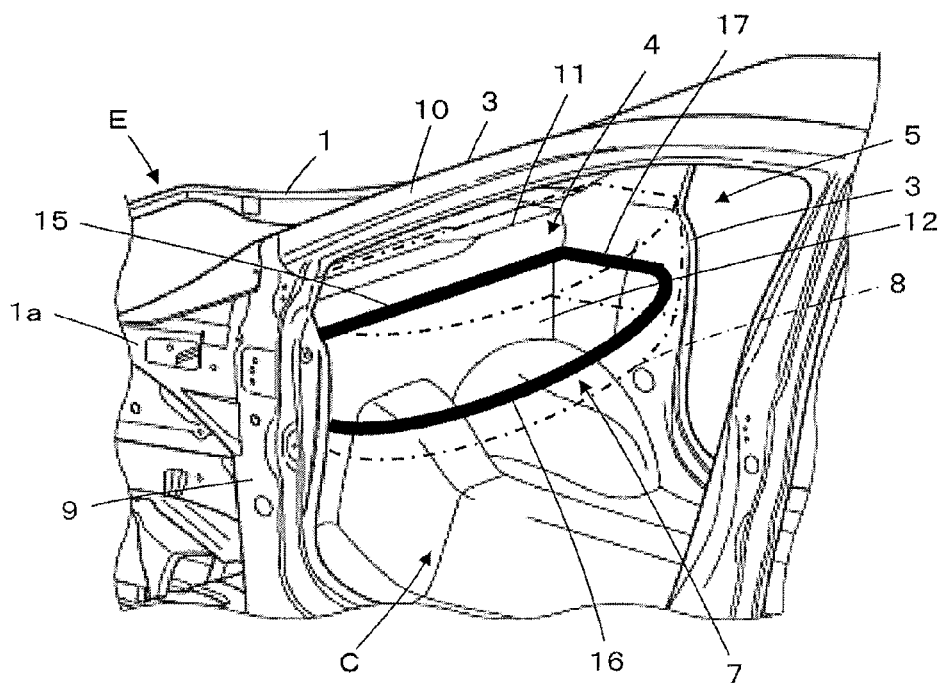

Hereinafter, one implementation of the present disclosure is described with reference to the accompanying drawings. FIGS. 1A and 1B illustrate a configuration of an automobile provided with a cabin front part supporting body according to the implementation of this disclosure. The automobile includes a pair of front upper frames 1 extending in vehicle longitudinal directions respectively at both side parts of the automobile. A pair of front side frames 2 extending in the longitudinal directions is disposed between the pair of front upper frames 1, and front pillars 3 in a pair are respectively coupled to rear end parts 1a of the pair of front upper frames 1. A windshield (not illustrated) is disposed between the pair of front pillars 3, and a cabin front wall part 4 is provided below the windshield. Cabin side wall parts 5 are provided so as to extend rearward respectively from both side edge parts of the cabin front wall part 4, and a front side of each of the cabin side wall parts 5 is comprised of one of the pair of front pillars 3. Top mount panels 6 for suspensions are disposed forward of the cabin front wall part 4, and a cabin front part supporting body 7 is disposed rearward of the cabin front wall part 4. An instrument panel 8 is disposed so as to cover the cabin front part supporting body 7 from the rear. Thus, an engine room E is formed forward of the cabin front wall part 4 and a cabin C is formed rearward of the cabin front wall part 4.

The front upper frames 1 are coupled to intermediate parts of the front pillars 3 at the rear end parts 1a thereof, respectively. The rear end part 1a of each front upper frame 1 is formed wider in vehicle vertical directions. An upper side of the rear end part 1a extends toward an upper end of the front pillar 3 while a lower side of the rear end part 1a extends toward a lower end of the front pillar 3. The front side frames 2 are respectively disposed below the front upper frames 1 and rear end parts of the front side frames 2 are formed to extend below the cabin front wall part 4.

Each front pillar 3 includes a lower part 9 (hereinafter, referred to as "the front pillar lower part 9") extending in the vehicle vertical directions and an upper part 10 (hereinafter, referred to as "the front pillar upper part 10") extending so as to incline upwardly and rearwardly from an upper end of the front pillar lower part 9. The front pillar lower part 9 is formed wide in the longitudinal directions and constitutes the front side of the cabin side wall part 5. The front pillar upper part 10 is formed to conform to a side edge of the windshield. The top mount panels 6 are to support upper parts of the suspensions. The top mount panels 6 are disposed respectively at corners forward of the cabin front wall part 4, where the cabin front wall part 4 is coupled with the front upper frames 1, and are respectively joined to portions near the rear end parts 1a of the front upper frames 1. Each top mount panel 6 has a hollow cylindrical shape with an opening formed at a lower part thereof, and an upper side of the suspension is accommodated in the top mount panel 6 via the opening and fixed therein.

Figure 2:
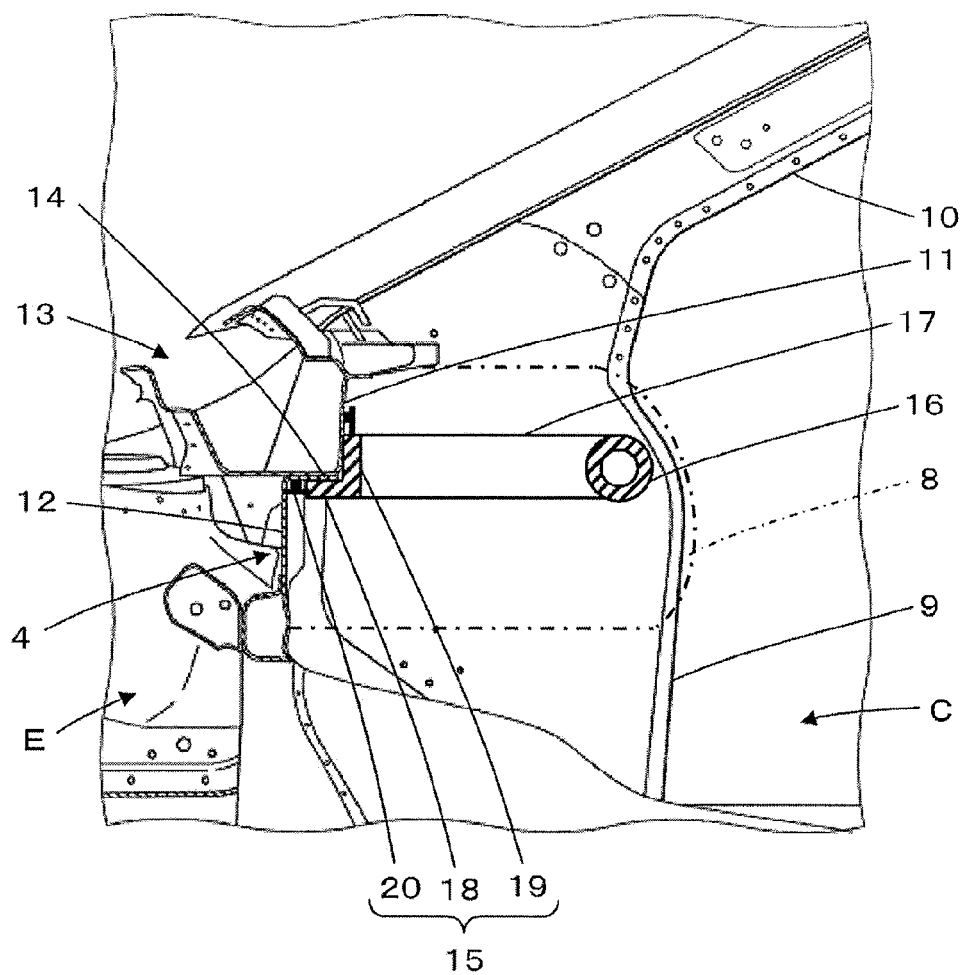
FIG. 2 is a partial cross-sectional view illustrating a position of the cabin front part supporting body with respect to a cabin front wall part.

As illustrated in FIG. 2, the cabin front wall part 4 is formed by bending a steel plate, and is to partition the cabin C from the engine room E. The cabin front wall part 4 is disposed so as to cover a front side of the instrument panel 8. The cabin front wall part 4 includes a bulkhead 11 and a toe board 12 disposed below the bulkhead 11. The bulkhead 11 is disposed below the windshield. An upper part of the bulkhead 11 conforms to a lower edge of the windshield, and both side edges of the bulkhead 11 are respectively joined to the front pillar lower parts 9. The bulkhead 11 has a box shape with an upper part thereof opened outside. An accommodating part 13 is formed inside the bulkhead 11 to accommodate a windshield wiper mechanism, etc.

The toe board 12 is used for an automobile operator and/or a passenger inside the cabin C to rest their feet thereon. The toe board 12 is formed so as to extend from a bottom part of the cabin C, gradually incline upwardly and forwardly, and then stand upwardly. An upper edge part of the toe board 12 is bent rearward, and an upper surface thereof is formed to oppose to a lower surface of the bulkhead 11. The toe board 12 is joined to the front pillar lower parts 9 at both side edge parts thereof. The lower surface of the bulkhead 11 is joined to the upper surface of the toe board 12 by, for example, spot welding. Thus, a thickened part 14 of the cabin front wall part 4 is formed so as to continuously extend in vehicle width directions W of the automobile.

The cabin front part supporting body 7 is to support the cabin front wall part 4. The cabin front part supporting body 7 is disposed inside the instrument panel 8, and is constructed by annularly coupling a front frame 15, a rear frame 16 and a pair of side frames 17. The front frame 15 is provided so as to extend in the vehicle width directions W while contacting the thickened part 14 of the cabin front wall part 4. The front frame 15 is directly joined to the front pillar lower parts 9 at both end parts thereof with bolts, etc. The front frame 15 is formed into an L-shape in a lateral cross section. That is, the front frame 15 has a bottom part 18 which is formed wide in the vehicle longitudinal directions and a side part 19 which is formed wide in the vehicle vertical directions so that the bottom part 18 is coupled with the side part 19 to form the L-shape. The front frame 15 is disposed so that the bottom part 18 contacts the thickened part 14 from below while the side part 19 contacts the thickened part 14 from the rear. The front frame 15 is provided with a plurality of flange parts 20 which are separated from each other in the vehicle width directions W. The front frame 15 continuously contacts the thickened part 14 by joining the flange parts 20 to the cabin front wall part 4 by, for example, spot welding.

The rear frame 16 is disposed inside the instrument panel 8 and rearward of the front frame 15. The rear frame 16 extends in the vehicle width directions W and is directly joined to the front pillar lower parts 9 at both end parts thereof with bolts, etc. The rear frame 16 supports a steering column, etc. and thus also functions as a so-called steering support beam. The pair of side frames 17 is provided so as to extend in the vehicle longitudinal directions along the front pillar lower parts 9. The side frames 17 are respectively joined to the both end parts of the front frame 15 at tip-end parts thereof, and are respectively joined to the both end parts of the rear frame 16 at rear end parts thereof. The instrument panel 8 is an interior member where gauges including a speedometer are disposed, and is attached to the cabin front part supporting body 7.

Figure 5:
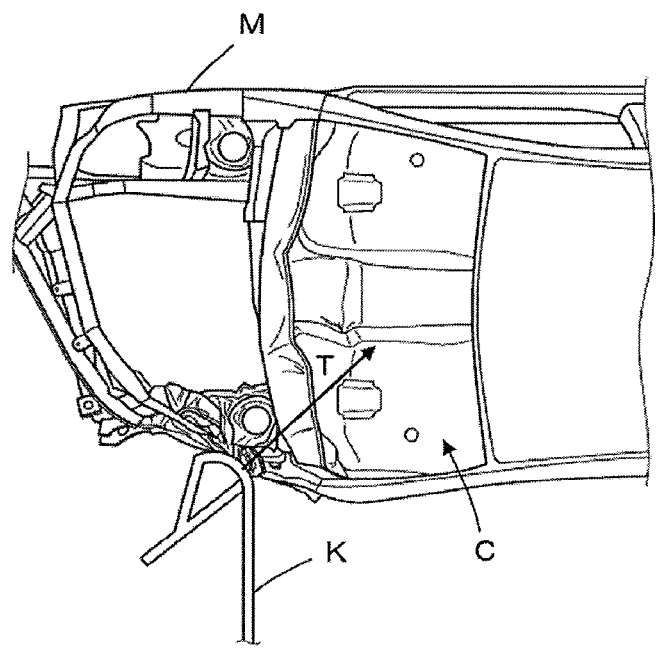
FIG. 5 is a view illustrating a situation where an object collides with a side part of an automobile.

Next, operation of this implementation is described. First, as illustrated in FIG. 5, an object K collides with a side part of an automobile, and an impact T is obliquely inputted into the automobile from outside of one of the front upper frame 1 (left side in this example). Here, the cabin front wall part 4 constituting a front surface of the cabin C directly receives the impact T since not enough number of frames which are to absorb the impact T from the object K are provided between the cabin C and the side part of the automobile.

Here, if the cabin front wall part 4 is not supported by the cabin front part supporting body 7, the cabin front wall part 4 may easily buckle by the impact T of the object K. Once the buckling of the cabin front wall part 4 is caused, the cabin front wall part 4 is easily bent rearward from the buckled part as an origin, and the cabin C is then deformed. For example, the top mount panel 6 is pushed inwardly by the impact T of the object K, which then causes a buckling of the bulkhead 11 and an upper part of the toe board 12. Thus, the toe board 12 is entirely bent rearward from the buckled part as an origin.

However, in this implementation, the buckling of the cabin front wall part 4 can be reduced to prevent the cabin front wall part 4 from bending rearward, by providing the front frame 15 of the cabin front part supporting body 7 so as to extend in the vehicle width directions W while contacting the thickened part 14, which has a higher strength in the cabin front wall part 4. Generally, the joined part of the bulkhead 11 and the toe board 12 is thickened by the joining and, thus, formed to have the highest strength in the cabin front wall part 4. Therefore, the buckling of the cabin front wall part 4 can effectively be reduced by providing the front frame 15 along the joined part having a higher strength. Further, since the front frame 15 is provided to contact the cabin front wall part 4 without any gap therebetween, the buckling of the cabin front wall part 4 can certainly be reduced. Furthermore, since the front frame 15 is formed into the L-shape in the lateral cross section, the front frame 15 can be disposed to cover the joined part of the bulkhead 11 and the toe board 12, and thus the cabin front wall part 4 can certainly be supported.

Further, the bulkhead 11 and the periphery thereof are generally constructed to have flexibility to a certain degree so as not to give a large impact to a pedestrian who is thrown onto near the bulkhead 11 when the automobile collides with the pedestrian. Here, since the front frame 15 is disposed below the bulkhead 11, the cabin front wall part 4 can be supported without deteriorating the flexibility of the bulkhead 11. Thus, the front frame 15 can prevent the cabin front wall part 4 from bending rearward while maintaining the flexibility of the bulkhead 11.

Furthermore, the front frame 15 is coupled to the side frames 17 extending rearward therefrom. The side frames 17 are respectively coupled to the front pillar lower parts 9 at the rear end parts thereof via the rear frame 16, and thus the side frames 17 can strongly support the front frame 15. In addition, the front frame 15, the rear frame 16 and the pair of side frames 17 are annularly coupled. For example, in a case of the cabin front wall part 4 directly receiving the impact T of the object K, the front frame 15 may easily be deformed if the cabin front wall part 4 is supported against the impact T only by a single frame (e.g., the front frame 15). Therefore, the entire structure existing in the periphery of the cabin front part supporting body 7 can support the cabin front wall part 4 by a surface, by forming the cabin front part supporting body 7 into the annular shape, thereby certainly reducing the bending of the cabin front wall part 4.

As described above, since the annular cabin front part supporting body 7 is provided inside the instrument panel 8, the cabin front wall part 4 can be strongly supported, and therefore the deformation of the cabin C can be prevented. Further, since the cabin front part supporting body 7 is formed into the annular shape, the deformation of the cabin C can be prevented while securing a space inside the instrument panel 8 where devices such as an air conditioner and an automotive navigation system are mounted.

According to this implementation, the deformation of the cabin C can certainly be prevented since the cabin front part supporting body 7 has the annular shape and the front frame 15 is provided so as to extend in the vehicle width directions W while contacting the thickened part 14 of the cabin front wall part 4.

Figure 3:
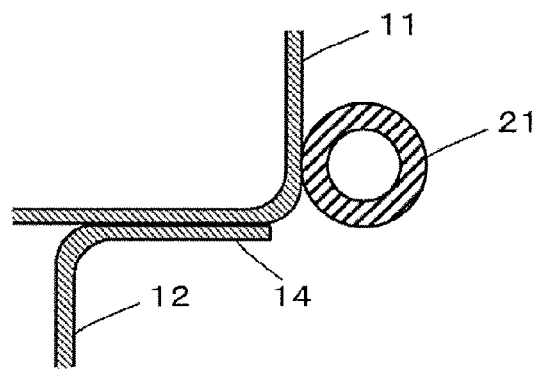
FIG. 3 is a cross-sectional view illustrating a cabin front part supporting body according to a modification.
Figure 4:
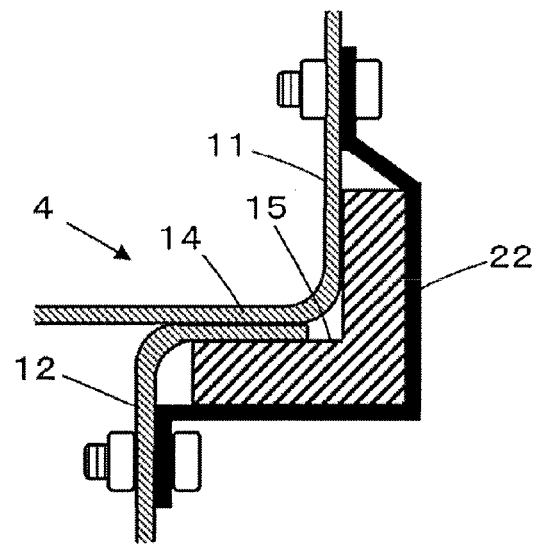
FIG. 4 is a cross-sectional view illustrating a cabin front part supporting body according to another modification.

Note that although the front frame 15 is formed to have the L-shape in the lateral cross section in the implementation described above, the shape is not limited to the L-shape as long as the front frame is provided so as to contact the thickened part 14 of the cabin front wall part 4. For example, as illustrated in FIG. 3, a front frame 21 having a tubular shape may be provided so as to contact the joined part of the bulkhead 11 and the toe board 12 from the rear. Further, although the front frame 15 is joined to the cabin front wall part 4 by spot-welding the flange parts 20 to the cabin front wall part 4 in the implementation described above, the joining method is not limited to the spot welding as long as the front frame 15 is fixed to the cabin front wall part 4. For example, as illustrated in FIG. 4, a bracket 22 may be disposed, instead of the flange parts 20, so as to cover the front frame 15 from outside, and an upper edge side and a lower edge side of the bracket 22 may be fixed to the cabin front wall part 4 with bolts.

Further, although the front frame 15 is provided so as to contact the joined part of the bulkhead 11 and the toe board 12 in the implementation described above, the contacting part is not limited to the joined part as long as the front frame 15 contacts a thickened part of the cabin front wall part 4 having a higher strength. For example, the cabin front wall part 4 may be locally bent to have a thickened portion, and the front frame 15 may be provided so as to contact the thickened portion. Further, the front frame 15 is provided along the thickened part 14 which is continuously formed in the cabin front wall part 4 in the vehicle width directions W in the implementation described above; however, if thickened parts are intermittently formed with gaps therebetween in the cabin front wall part 4 in the vehicle width directions W, the front frame 15 may be provided to extend in the vehicle width directions W while respectively contacting the thickened parts.

Further, although the rear frame 16 functions as a steering support beam which supports a steering column, etc. in the implementation described above, a steering support beam may be provided in addition to the rear frame 16. Further, the cabin front part supporting body 7 may be made of material which can sustain against the impact T of the object K, such as steel and reinforced resin. For example, the cabin front part supporting body 7 may be integrally formed with the instrument panel 8 by being made of reinforced resin, and thus the internal structure of the instrument panel 8 can be simplified.

The invention claimed is:

1. A vehicle body structure, comprising:
a cabin front wall part disposed to cover a front side of an instrument panel and having a thickened part; and
a cabin front part supporting body, comprising:
a front frame covering the thickened part from a rear side of the cabin front wall part, and extending in a vehicle width direction;
a rear frame disposed inside the instrument panel and rearward of the front frame, and extending in the vehicle width direction; and
a pair of side frames joined directly to the front frame and the rear frame so as to couple both end parts of the front frame to both end parts of the rear frame respectively, and extending in a vehicle longitudinal direction,
wherein an annular structure is formed of the front frame, the side frames, and the rear frame.

2. The vehicle body structure of claim 1, wherein the cabin front wall part comprises a bulkhead, and a toe board disposed below the bulkhead, and
the thickened part is formed at a location where the bulkhead is joined to the toe board.

3. The vehicle body structure of claim 1, wherein the thickened part is formed in the cabin front wall part so as to continuously extend in the vehicle width direction, and
the front frame extends along the thickened part.

4. The vehicle body structure of claim 2, wherein the thickened part is formed in the cabin front wall part so as to continuously extend in the vehicle width direction, and
the front frame extends along the thickened part.

5. The vehicle body structure of claim 1, wherein the end parts of the rear frame are coupled to respective front pillars, the front pillars being disposed so as to interpose the instrument panel between the front pillars.

6. The vehicle body structure of claim 2, wherein the end parts of the rear frame are coupled to respective front pillars, the front pillars being disposed so as to interpose the instrument panel between the front pillars.

7. The vehicle body structure of claim 3, wherein the end parts of the rear frame are coupled to respective front pillars, the front pillars being disposed so as to interpose the instrument panel between the front pillars.

8. The vehicle body structure of claim 4, wherein the end parts of the rear frame are coupled to respective front pillars, the front pillars being disposed so as to interpose the instrument panel between the front pillars.

9. The vehicle body structure of claim 1, wherein the rear frame is a steering support beam configured to support a steering column inside the instrument panel.

10. The vehicle body structure of claim 2, wherein the rear frame is a steering support beam configured to support a steering column inside the instrument panel.

11. The vehicle body structure of claim 3, wherein the rear frame is a steering support beam configured to support a steering column inside the instrument panel.

12. The vehicle body structure of claim 4, wherein the rear frame is a steering support beam configured to support a steering column inside the instrument panel.

13. The vehicle body structure of claim 5, wherein the rear frame is a steering support beam configured to support a steering column inside the instrument panel.

14. The vehicle body structure of claim 6, wherein the rear frame is a steering support beam configured to support a steering column inside the instrument panel.

15. The vehicle body structure of claim 7, wherein the rear frame is a steering support beam configured to support a steering column inside the instrument panel.

16. The vehicle body structure of claim 8, wherein the rear frame is a steering support beam configured to support a steering column inside the instrument panel.

17. The vehicle body structure of claim 1, wherein
the thickened part is formed at a joining of a first part and a second part, and the front frame contacts both the first part and the second part.

* * * * *